United States Patent [19]
Yada et al.

[11] Patent Number: 5,588,691
[45] Date of Patent: Dec. 31, 1996

[54] WINDSHIELD MOLDING FOR VEHICLES AND THE PRODUCTION METHOD THEREOF

[75] Inventors: Yukihiko Yada, Nagoya; Yoichi Hirai, Ohbu, both of Japan

[73] Assignee: Tokai Kogyo Kabushiki Kaisha, Ohbu, Japan

[21] Appl. No.: 582,598

[22] Filed: Jan. 3, 1996

Related U.S. Application Data

[63] Continuation of Ser. No. 168,192, Dec. 17, 1993, abandoned, which is a continuation-in-part of Ser. No. 30,066, filed as PCT/JP92/00395, Mar. 30, 1992, abandoned.

[30] Foreign Application Priority Data

Jul. 25, 1991 [JP] Japan ................................ 3-208600

[51] Int. Cl.$^6$ ........................................ B60J 1/02
[52] U.S. Cl. ................ 296/93; 276/146.15; 52/204.597
[58] Field of Search ..................... 296/93, 201, 146.15; 52/208, 204.597, 204.591

[56] References Cited

U.S. PATENT DOCUMENTS

| | | |
|---|---|---|
| 5,061,335 | 10/1991 | Tamura et al. . |
| 5,070,590 | 12/1991 | Fujioka et al. . |
| 5,074,610 | 12/1991 | Tamura et al. . |
| 5,078,444 | 1/1992 | Shirahata et al. . |
| 5,107,646 | 4/1992 | Tamura . |
| 5,112,547 | 5/1992 | Nakashima et al. . |
| 5,133,537 | 7/1992 | Shirahata et al. . |
| 5,174,623 | 12/1992 | Yada et al. ........................ 296/93 |
| 5,193,875 | 3/1993 | Tamura . |
| 5,193,876 | 3/1993 | Yada et al. ........................ 296/93 |
| 5,203,946 | 4/1993 | Tamura et al. . |
| 5,233,805 | 8/1993 | Hirai et al. . |
| 5,374,096 | 12/1994 | Yada ................................ 296/93 |

OTHER PUBLICATIONS

Patent Abstracts Of Japan, JP5-24433, Feb. 2, 1993.
Patent Abstract Of Japan, JP4-365621, Dec. 17, 1992.

*Primary Examiner*—Dennis H. Pedder
*Attorney, Agent, or Firm*—Oblon, Spivak, McClelland, Maier & Neustadt, P.C.

[57] ABSTRACT

A windshield molding which drains rainwater smoothly through the rainwater groove provided at necessary sections and having different depth in the longitudinal direction for better drainage can be produced simply and continuously as a single molding without the addition of cutting or other processes.

23 Claims, 14 Drawing Sheets

[Fig. 1]
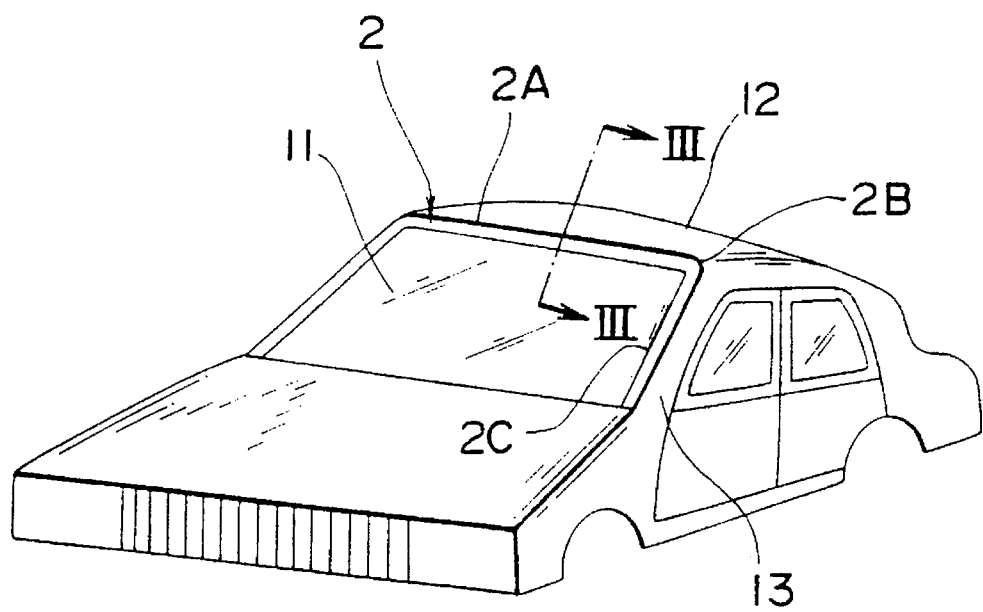

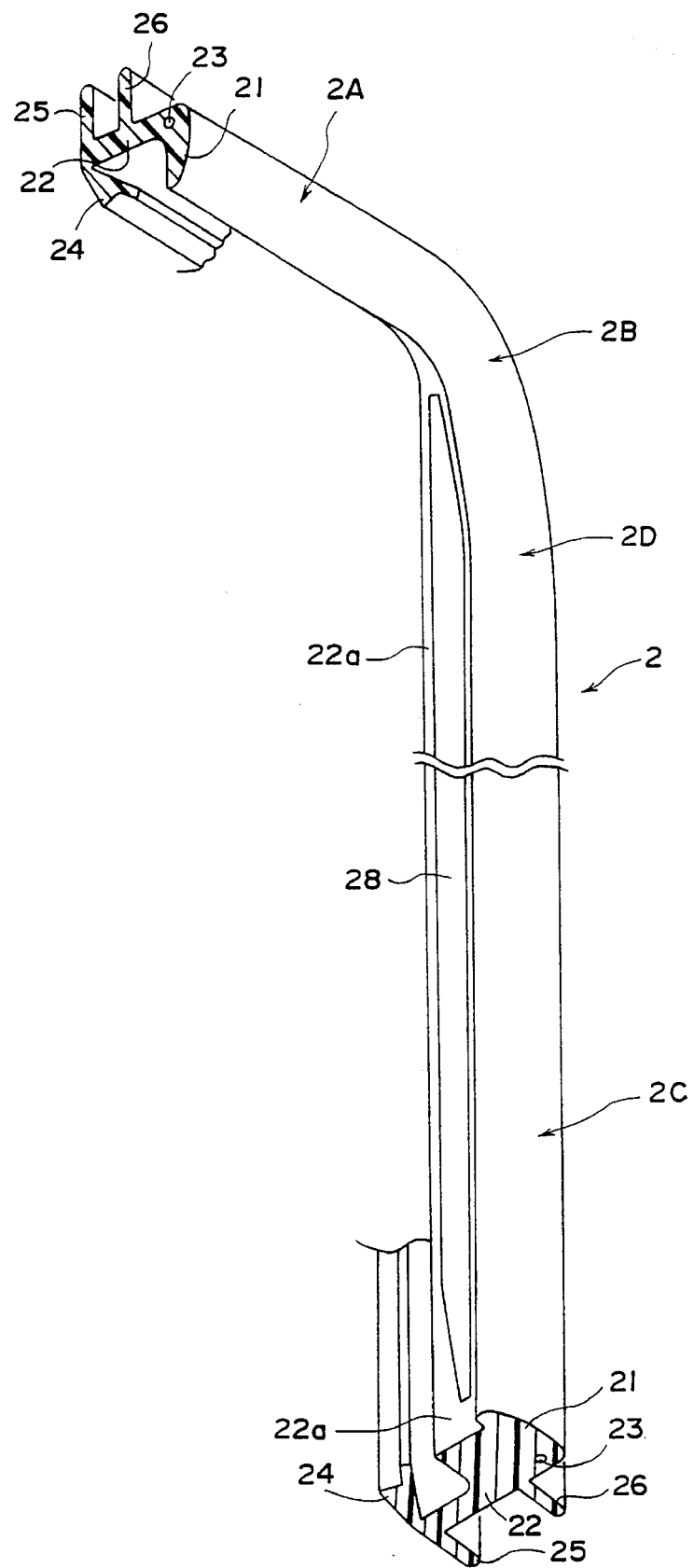
[Fig. 2]

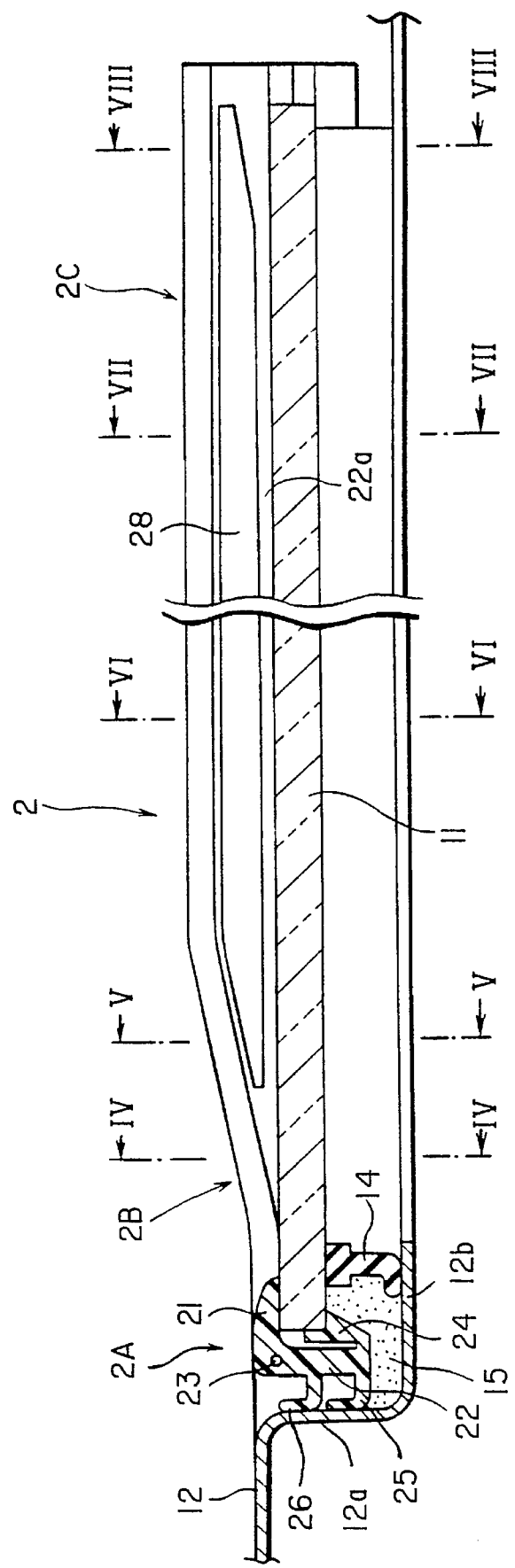

[Fig. 4]
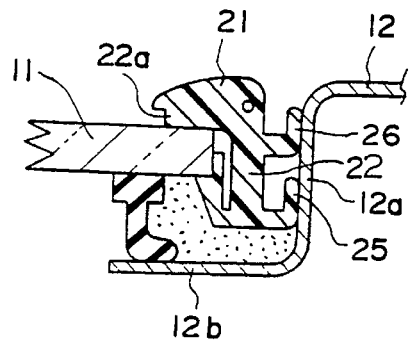
[Fig. 5]
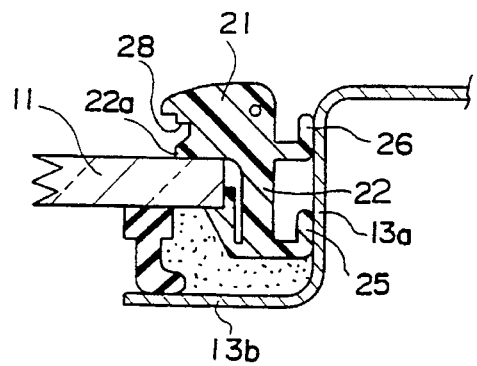
[Fig. 6]
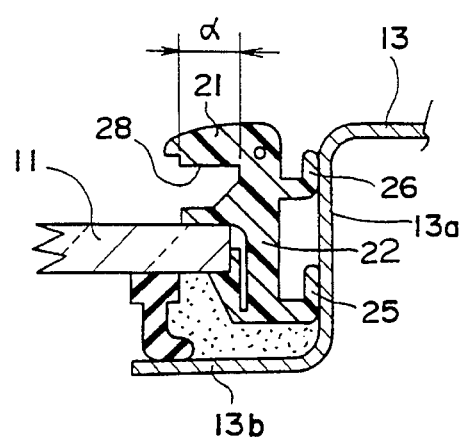

[Fig. 7]
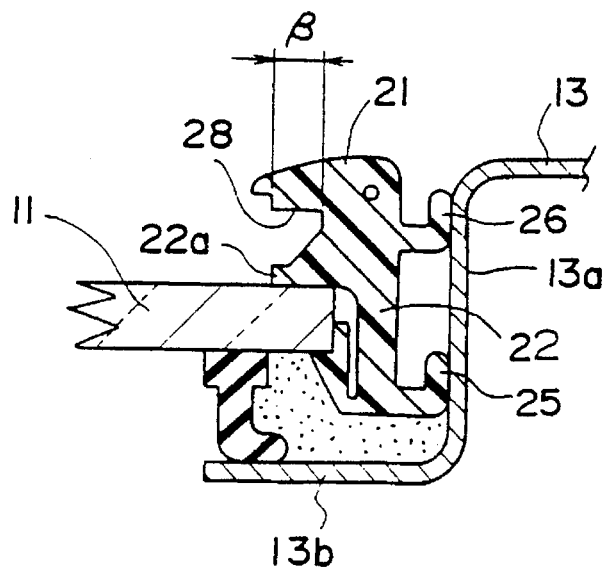
[Fig. 8]
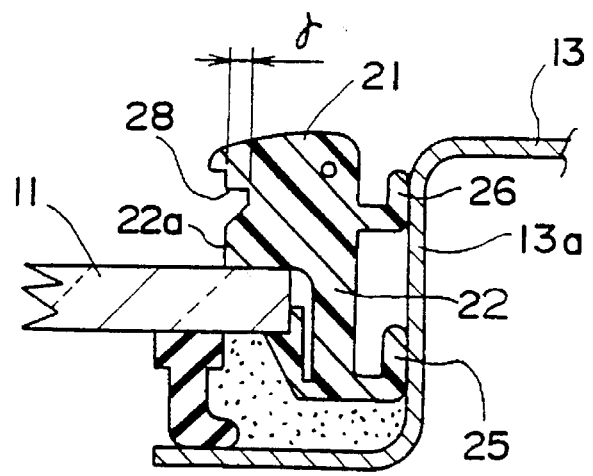

[Fig. 9]
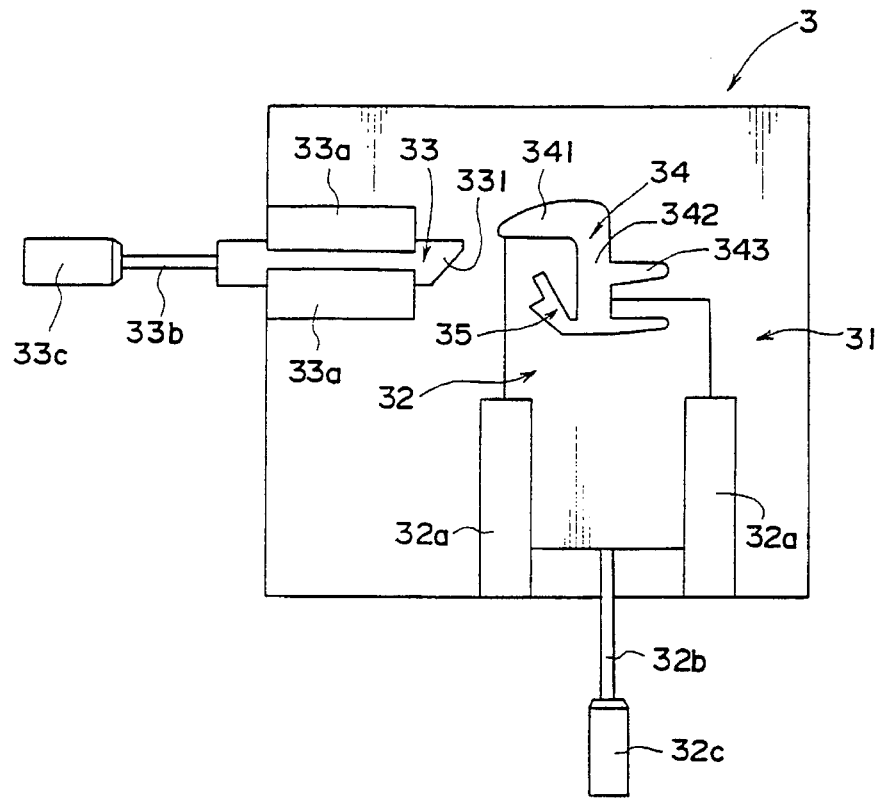
[Fig. 10]
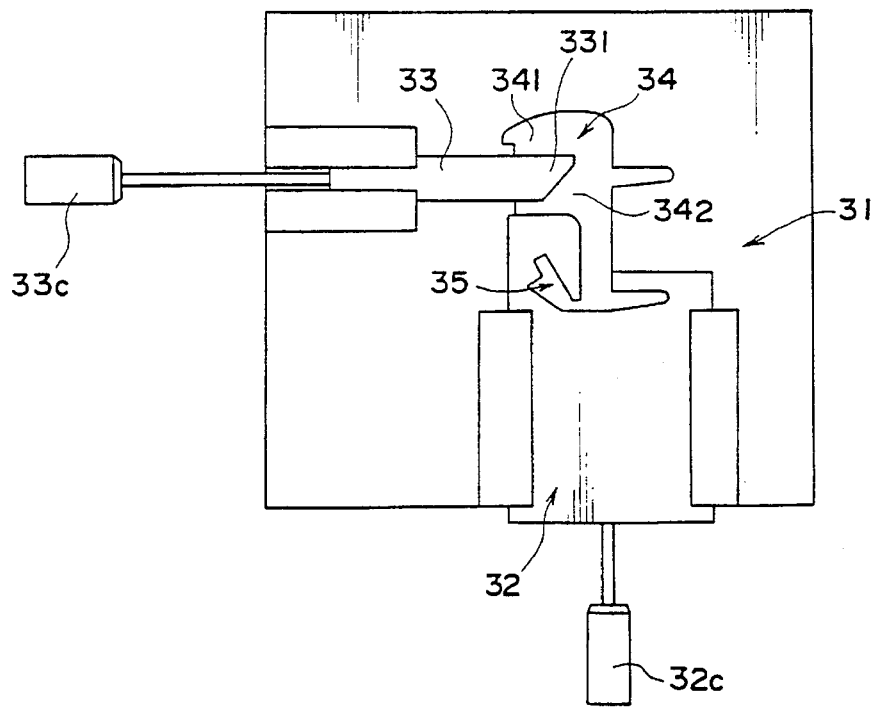

[Fig. 12]
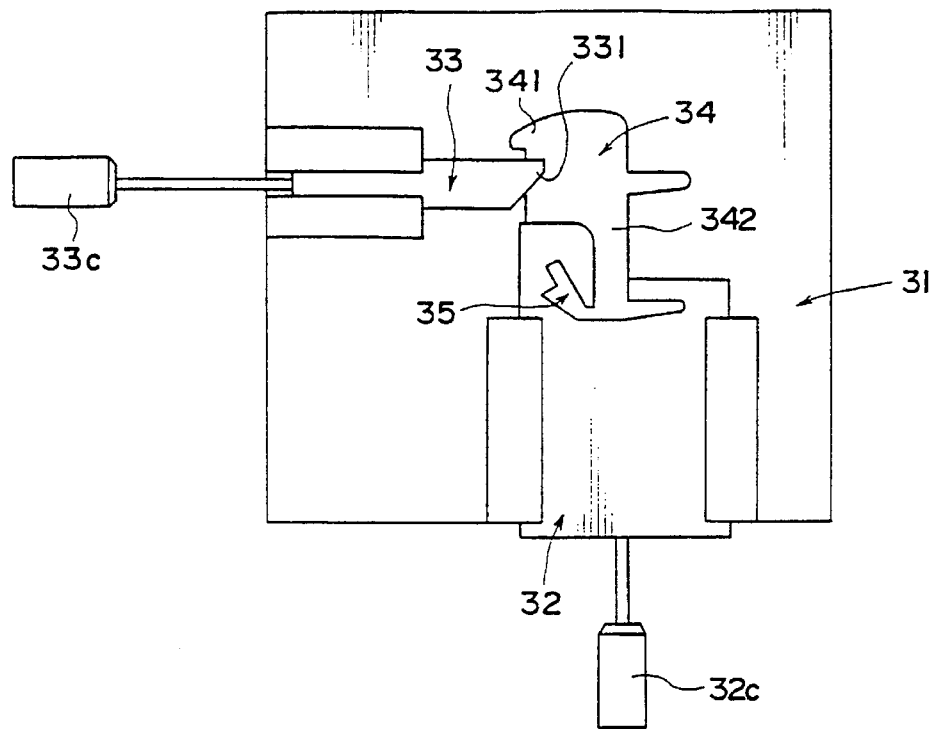
[Fig. 11]
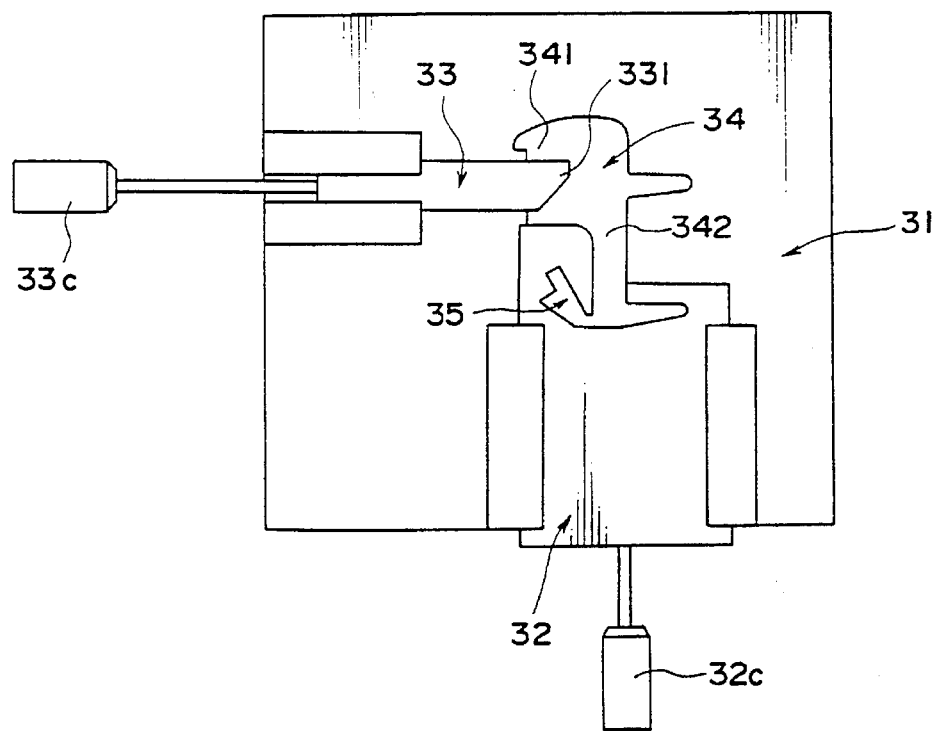

[Fig. 14]
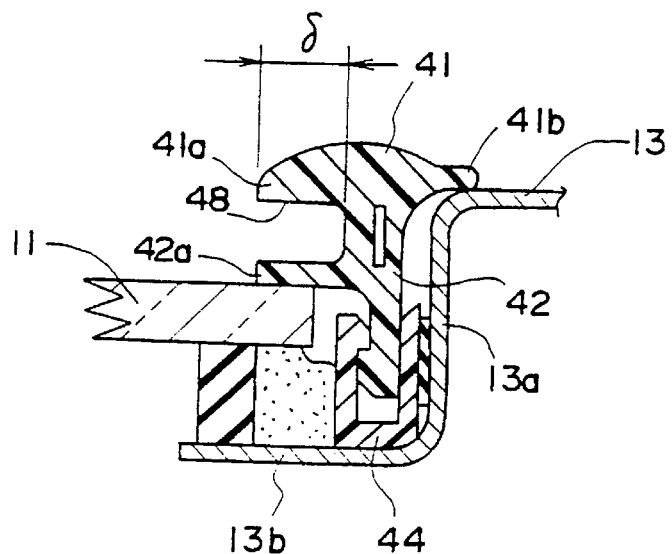
[Fig. 15]
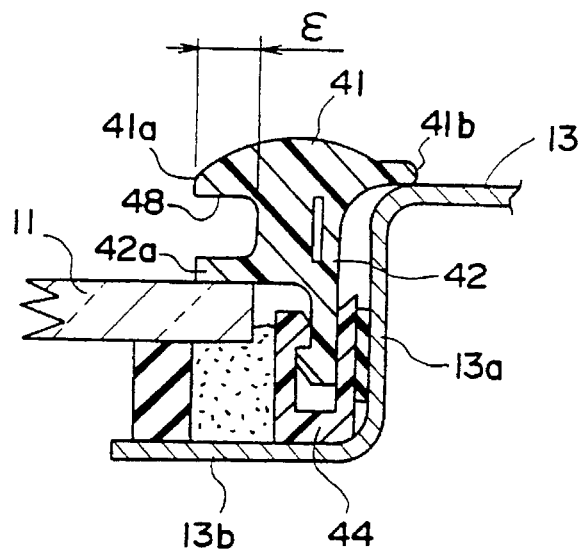

5,588,691

WINDSHIELD MOLDING FOR VEHICLES AND THE PRODUCTION METHOD THEREOF

This application is a Continuation of application Ser. No. 08/168,192, filed on Dec. 17, 1993, now abandoned, which is a Continuation-in-Part of application Ser. No. 08/030,066, filed Mar. 24, 1993, now abandoned, filed as PCT/JP 92/00395 on Mar. 30, 1992.

BACKGROUND ART

A windshield molding is generally installed along the periphery of the windshield glass mounted in the window frame opening of a body panel. To be more precise, a long belt-shaped space is formed between the periphery of the windshield glass and the edge of the window opening of the body panel, and a windshield molding of a long belt-shaped extruded material is inserted into said space for sealing. The windshield molding consists of a support leg, which is inserted in the above space, and a decorative portion, which covers the space from the outside.

Japanese Utility Model Gazette No. 54416/1982 and other background art have proposed that such a windshield molding for vehicles should have grooves to drain rainwater from the windshield glass. In this case, it is desirable to provide grooves only at the places where they are really required so as to avoid whistling sounds being created during vehicle motion and to avoid the use of a more rigid material. Also, since rainwater is forced to flow upward on the windshield glass when the vehicle is traveling, the lower end section area of the side molding section is able to be comparatively small. Therefore, Japanese Utility Model Gazette No. 15044/1987 and Japanese Utility Model Laid-Open Publication No. 31513/1984 stipulate that such a windshield molding should have a groove only in either the upper area or the lower area of the side molding section.

Grooves for the above utility models are made to have constant cross sections in their longitudinal direction. Therefore, they cannot convey and drain rainwater effectively. Windshield molding with such grooves cannot be formed in one piece with current extrusion molding technology. Namely, the groove must be formed by injection molding, but, in this case, the windshield molding should be composed of more than one connecting member. This requires larger injection molds and increased man-hours, resulting in lower productivity. The above publications have not disclosed how to form the groove.

The present invention intends to provide a vehicle windshield molding with good draining function and the production method thereof with a simple device.

DISCLOSURE OF INVENTION

To attain the above purpose, the windshield molding for vehicles of the present invention comprises an upper molding section and a pair of side molding sections to be fitted along the periphery from the upper side to both sides of the windshield glass fitted into the window frame opening of the body panel, said windshield molding comprising; a support leg to be inserted into a space between the periphery of said windshield glass and an inner edge of the window frame opening of the body panel, a decorative portion to be provided on the outside edge of the support leg to cover said space from the outside, an enlarged thick section to be provided in said support leg and a rainwater groove opening to the inner periphery of the windshield molding, wherein said decorative portion has a constant cross-sectional form throughout the entire length of the windshield molding and is projected outwards apart from the windshield glass surface at least along the side molding section, and said enlarged thick section is inserted into the space between the decorative portion projected from the windshield glass surface and outer surface of the windshield glass, and said rainwater groove opening is provided in the enlarged thick section of said support leg, the groove depth being changed in the longitudinal direction of the windshield molding.

The production method of the windshield molding for vehicles of the present invention is to produce the upper molding section and the side molding sections which are installed along the periphery of the windshield glass from the upper side to both sides by extrusion molding, wherein said molding is extruded by using dies having an opening for extrusion molding of the support leg to be inserted into the space between the windshield glass and the window frame of the body panel and having another opening for extrusion molding of the decorative portion which covers the above-noted space from the outside, wherein the molding is extruded by keeping the area of the extrusion opening on the said die for the decorative portion constant all the time, wherein at least at the time of producing the side molding section, the area of the extrusion opening on the said die for the support leg is increased to provide the enlarged thick section between the outside surface of the windshield glass and the decorative portion, wherein another die is inserted into the extended area section of the extrusion opening on the said die for the support leg at a specified timing to form the rainwater groove on the side wall of the said enlarged thick section by partly shielding it, and wherein the rainwater groove depth is changed by changing the moving distance of the said other die during extrusion.

The above production method enables rainwater grooves to be provided only at the places where they are required, to change groove depth in the longitudinal direction to drain rainwater smoothly and to form the whole windshield molding as a single product only by extruding without adding cutting and other processes.

Therefore, since the present invention is effective in providing rainwater grooves only at the places where they are required, in changing the rainwater groove depth in the longitudinal direction to improve the drainage of rainwater and in forming the whole windshield molding as a single product only by molding without adding cutting and other processes, it also enables the forming of windshield moldings with rainwater draining grooves of sufficient retaining function easily, satisfactorily and continuously.

BRIEF DESCRIPTION OF THE DRAWINGS

FIG. 1 is an explanatory perspective view showing an automobile front containing the windshield molding produced according to the present invention.

FIG. 2 is an explanatory perspective view showing the structure of the windshield molding in the first embodiment of the present invention.

FIG. 3 is a cross-sectional view taken along the line III—III shown in FIG. 1.

FIG. 4 is a cross-sectional view taken along the line IV—IV shown in FIG. 3.

FIG. 5 is a cross-sectional view taken along the line V—V shown in FIG. 3.

FIG. 6 is a cross-sectional view taken along the line VI—VI shown in FIG. 3.

FIG. 7 is a cross-sectional view taken along the line VII—VII shown in FIG. 3.

FIG. 8 is a cross-sectional view taken along the line VIII—VIII shown in FIG. 3.

FIG. 9 is an explanatory front view showing an example of the extruder for the windshield moldings shown in FIG. 2 to FIG. 8.

FIG. 10 is an explanatory front view showing the extruder of FIG. 9 in a moved state.

FIG. 11 is an explanatory front view showing the extruder of FIG. 9 in a further moved state.

FIG. 12 is an explanatory front view showing the extruder of FIG. 9 in a further moved state.

FIG. 14 is a cross-sectional view taken along the line XIV—XIV shown in FIG. 13.

FIG. 15 is a cross-sectional view taken along the line XV—XV shown in FIG. 13.

BEST MODE FOR CARRYING OUT THE INVENTION

Figure 13:
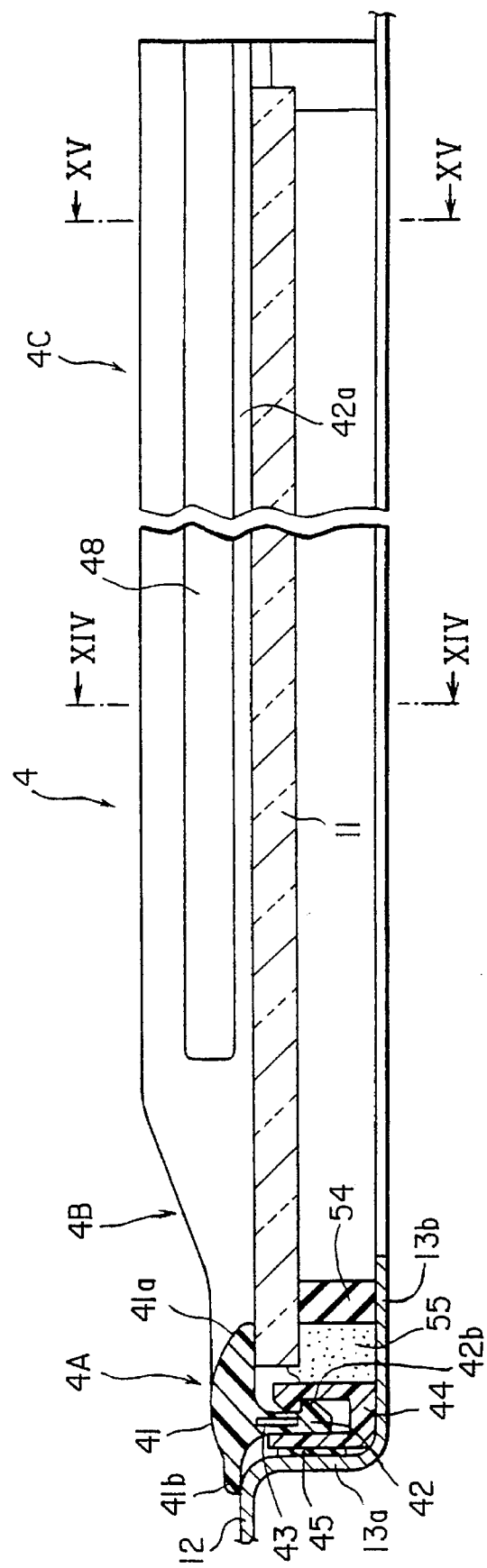
FIG. 13 shows the structure of the windshield molding in the second embodiment of the present invention and is a cross-sectional view similar to FIG. 3.
Figure 16:
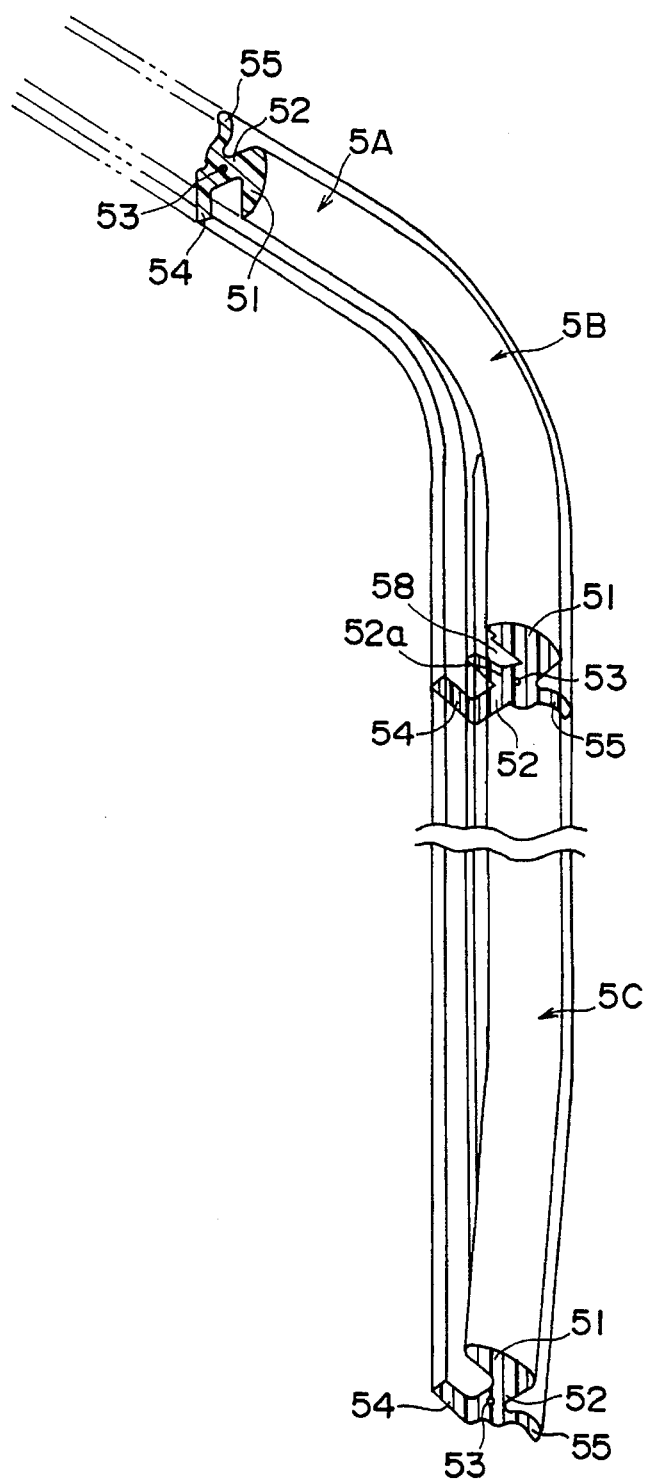
FIG. 16 shows another embodiment and includes an explanatory perspective view of a windshield molding.
Figure 17:
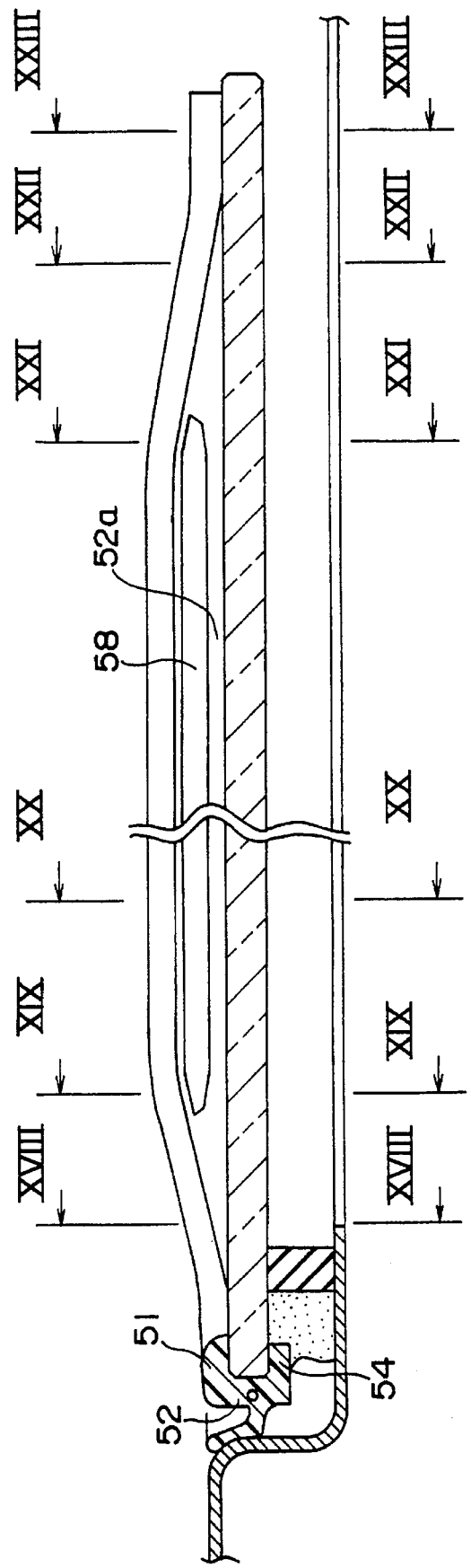
FIG. 17 is a cross-sectional view of the molding of FIG. 16.
Figure 18:
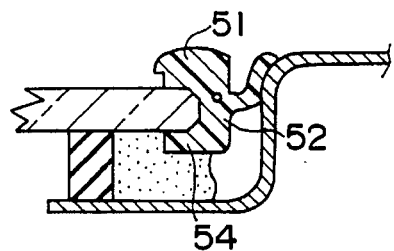
FIG. 18 is a cross-sectional view taken along line XVIII—XVIII in FIG. 17.
Figure 19:
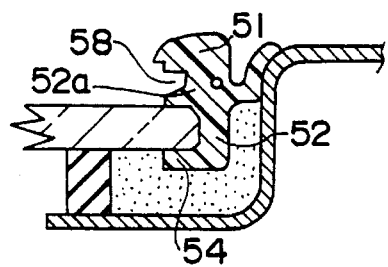
FIG. 19 is a cross-sectional view taken along line XIX—XIX in FIG. 17.
Figure 20:
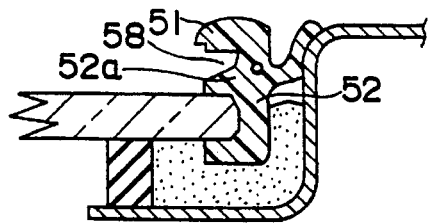
FIG. 20 is a cross-sectional view taken along line XX—XX in FIG. 17.

The following describes embodiments of the present invention according to the drawings:

As FIG. 1 shows, a windshield molding 2 composed of long belt-shaped extruded sealing members is installed along the periphery of the windshield glass 11 of an automobile. This windshield molding 2 is composed of the upper molding section 2A which is installed in the space between the upper edge of the above-mentioned windshield glass 11 and the roof panel 12, the side molding sections 2C of which are installed in the space between both side edges of the windshield glass 11 and the pillar panel 13 and the curved corner molding sections 2B with which the upper molding section 2A and the side molding sections 2C are connected. However, these moldings, 2A, 2B and 2C, are formed continuously as a single molding by extrusion as described later herein.

The windshield molding 2 in embodiment No. 1 shown in FIGS. 2 to 6 is made of elastic material such as rubber, synthetic resin, etc. into a long belt-shaped solid molding with the extruder described later herein, is provided with the support leg 22 which is inserted in the spaces between the periphery of the windshield glass 11 and both the roof panel 12 and the front pillar 13 and is provided with the decorative portion 21 which covers the above-mentioned space from the outside (the upper side of FIG. 3). The cross-sectional shape perpendicular to the longitudinal direction, consisting of the decorative portion 21 and the support leg 22 is an approximate L shape.

A wire 23 of the core is buried in the connection of the support leg 22 with the decorative portion 21. A lip-shaped portion 24 which holds the inside edge (the lower side) of the windshield glass 11 and an elastic lip 25 which extends to and is pressed to the walls of the body panels 12 and 13 are provided on the inside edge (the lower side of FIG. 3) of the support leg 22 throughout the entire length, and another elastic lip 26 is provided on the support leg 22 slightly outwards (the upper side of FIG. 3) and almost in parallel with the above-mentioned elastic lip 25.

The decorative portion 21 is the lip-shaped member extending from the outside edge (i.e. the upper side of FIG. 3) of the support leg 22 to the windshield glass 11 and covers the outer surface of the windshield glass 11 from the outside. The decorative portion 21 is formed to have a constant outer contour appearance at the outer surface throughout the entire length of the windshield molding.

The height of the support leg 22 from the inside edge to the outside edge (the vertical direction in FIG. 3) is short on the upper molding section 2A but is slightly longer on the side molding section 2C. This is because the height difference between the outer surface of the windshield glass 11 and that of the roof panel 12 is larger on the side sections than on the upper section as described later herein, namely, as the height difference changes, the height of the support leg 22 is changed. The height is gradually increased from the corner molding section (see FIGS. 4 and 5) and reaches the maximum on the upper side of the side molding section (see FIG. 6), but the maximum height is maintained to the lower area through the central area of the side molding section (see FIGS. 7 and 8).

At the portions where the height of the side molding section 2C is increased on the side panels, the above-mentioned decorative portion is projected apart from the outer surface of the windshield glass 11 by an amount corresponding to the height of the relevant support leg 22. Also, the enlarged thickened section 22a of the support leg 22 is inserted into the space between the decorative portion 21 projected from the outer surface of the windshield glass 11 and the outer surface of the windshield glass 11. Said enlarged thickened section 22a is the portion of the support leg enlarged to the inside of the molding, and the thickness in the direction from the outside to the inside (the vertical direction in the figure) of the said enlarged thick section 22a is changed by an amount corresponding to the height difference between the outer surface of the above-mentioned windshield glass 11 and the surface of the roof panel 12. As can be seen in FIG. 2, said enlarged thickened section 22a completely surrounds the upper and lower ends of the rainwater groove and is substantially equal in terms of both height and thickness.

In other words, the above-mentioned enlarged thickened section 22a is not provided on the upper molding section 2A where the height difference is constant (see FIG. 3), the decorative portion 21 and the support leg 22 which are equal in thickness and cross-sectional shape are provided throughout the entire length of the upper molding section 2A. Then, the thickness in the direction from the outside to the inside of the enlarged thickened section 22a on the support leg 22 is increased along the corner molding section 2B especially from the halfway position to the lower end 2D toward the side molding (see FIGS. 4 and 5) as the above-mentioned height difference increases. The enlarged thickened section 22a in this section is integrated with the decorative portion 21. Also, the thickness of the enlarged thickened section 22a is increased to the maximum in the longitudinal upper area and the approximate center area of the side molding section 2C (see FIGS. 6 and 7) corresponding to the largest height difference. The maximum thickness of the enlarged thick section 22a is kept constant on the side molding section from the center to the lower areas (See FIG. 8).

As mentioned above, the support leg 22 is provided with an enlarged thickened section 22a at the inside to correspond with the edge of the windshield glass 11, and a rainwater groove 28 is provided along the inside wall of the enlarged thickened section 22a and is open to the inside. The rainwater groove 28 is provided from the midpoint of the corner molding section 2B to the lower portion of the side molding section, its bottom being of almost triangular cross-sectional shape, and both walls are formed so as to be almost parallel at the opening. The depth of the rainwater groove 28 changes suitably along the longitudinal axis of the molding.

The rainwater groove provided on the corner molding section 2B shown in FIGS. 4 and 5 is only the tip of the triangle, and the depth and width of the rainwater groove 28 are gradually changed corresponding to the thickness of the above-mentioned enlarged thick section 22a. As FIGS. 6 and 7 show, the rainwater groove 28 is widest in the center area of the side molding section where the enlarged thickened section 22a is thickest. The largest groove width on the side molding section maintained for a certain length downward is reduced, and the rainwater groove 28 peters out at the specified position.

The depth of the rainwater groove 28 is changed irrespective of the above-mentioned groove width. The depth of the rainwater groove 28 is set to the maximum of $\alpha$ as shown in FIG. 6, at the upper portion of the side molding section. The width is maintained constant but the depth is changed to $\beta$, as shown in FIG. 7, slightly shallower than the maximum depth of $\alpha$ at a slightly lower position than the above-mentioned position.

The rainwater groove 28 provided at the lower portion of the side molding section is only the tip of the triangle, and the depth and width of the rainwater groove 28 is reduced as shown in FIG. 8 (Groove depth: $\gamma$).

The following discussion explains the structure on the body where the windshield glass is set with the windshield molding 2. The inside edge of the windshield glass opening is bent inwards in step form so as to accept the windshield glass 11, and flanges, 12b and 13b, are provided with bent walls, 12a and 13a. The height of the bent wall 12a along the upper molding section is uniform, but that of the bent wall 13a along the side molding section is gradually increased from the middle of the corner molding section.

The windshield molding 2 is installed first on the periphery of the windshield glass. At this time, the windshield glass 11 is set between the lip-shaped portion 24 of the upper molding section 2A and the decorative portion 21 along the upper edge and the corner edge of the windshield glass 11 and is set between the lip-shaped portions 24 of the side molding sections 2C and the enlarged thick sections 22a of the support legs 22 along the side edges of the windshield glass 11. The corner molding section 2B is curved to the specified bending rate as the windshield molding 2 is installed, but since the support leg 22 is thickened as described above, no wrinkles or other nonconformities will be caused due to the difference in length of the inner and the outer bending circumferences.

On the other hand, a belt-like rubber dam 14 is adhered to the flanges 12b and 13b on the above-mentioned body panels 12 and 13, and adhesive is filled by extrusion around the outer periphery of the rubber dam 14. The inner side of the windshield glass 11 on which the windshield molding 2 is installed is pressed onto the above-mentioned rubber dam. As a result, the lip-shaped portion 24 of the windshield molding 2 is fixed with the adhesive 15, and the elastic lips 25 and 26 are bent and fixed to the bent walls 12a and 13a, respectively. The elastic rebound force caused by bending the elastic lips 25 and 26 works as the fixing force and the posture stabilizing force of the windshield molding 2.

The windshield glass 11 is thus fixed on the flanges 12b and 13b on the body panels 12 and 13 at approximately the same height all around. The thickness of the enlarged thickened section 22a of the support leg 22 is set according to the height difference created between the outer surface of the windshield glass 11 and the surface of the roof panel 12 corresponding to the heights of the bent walls 12a and 13a. First, there is scarcely any height difference on the upper molding section (see FIG. 3) throughout the overall length, the decorative portion 21 and the support leg 22 are maintained with a uniform cross-sectional shape, and no enlarged thick section is formed on the support leg 22. A slight height difference is provided on the corner molding section (see FIGS. 4 and 5), and an enlarged thickened section 22a is provided on the support leg 22 corresponding to the height difference. The thickness of the enlarged thickened section 22a is gradually increased toward the side molding section corresponding to the change in height difference. The height difference is gradually increased from the middle of the corner molding section to the side molding section, and the maximum height difference is set in the upper and middle areas (see FIGS. 6 and 7) in the longitudinal direction of the side molding section. The thickness of the enlarged thickened section 22a is set to the maximum amount corresponding to the maximum height difference, and the thickness is maintained constant through to the lower area of the side molding section (see FIG. 8).

In the case of the structure for installing the windshield glass 11 on the vehicle body, rainwater falling on the windshield glass 11 runs over the inner peripheral wall of the decorative portion 21 of the upper and the corner molding sections 2A, 2B toward the roof panel and rainwater collected at the side molding section is led through the rainwater groove 28 provided in the enlarged thickened section 22a of the support leg 22. At this time, the depth of the rainwater groove 28 is changed so that the rainwater in the groove will flow smoothly and drain well.

The windshield molding 2 installed on the windshield molding 11 may be inserted into the window opening, or the windshield glass 11 inserted into the window frame in advance and the windshield molding may be inserted into the space between the periphery of the windshield glass 11 and the body panels 12 or 13.

The following discussion explains the device for forming the above-mentioned windshield molding 2.

As FIGS. 9 to 12 show, the molding forming unit 3 is fitted with three dies for forming an opening for extruding synthetic resin. These dies are first die 31, second die 32 and third die 33 arranged in the molding extruding direction (vertical direction on the paper). The first die is fixed and has an extrusion opening 34 to form the decorative portion 21, the support leg 22 and the elastic lip 26 of the windshield molding 2. The lower section of the extrusion open 34, equivalent to the lip-shaped portion 24 and the elastic lip 25 of the windshield molding 2, is provided with a large rectangular opening including the above portions 24 and 25.

The above-mentioned extrusion opening 34 comprising an extrusion opening 341 for the decorative portion 21, an extrusion opening 342 for the support leg 22 and an extrusion opening 343 for the elastic lip 26. The extrusion opening 341 is covered with a bow-shaped upper portion similar to the upper edge of the decorative portion of the windshield molding 2. In addition, the extrusion opening 342 is shaped like the enlarged thick section 22a of the support leg 22 without the rainwater groove 28 and is connected to the extrusion opening 341.

The second die 32 and third die 33 are made of plate and are supported with pairs of guides, 32a, 32a and 33a, 33a respectively so as to move in parallel with the front of the first die 31. The extrusion opening 35 of the second die 32 is shaped so as to correspond to the lower portion of the support leg 22 of the windshield molding 2, the lip-shaped portion 24 and the elastic lip 25. In addition, dies 31 and 32 are aligned so that an open area provided at the upper side of the section corresponding to the support leg 22 is connected to the section corresponding to the enlarged thick section 22a in the extrusion opening 34 of the first die 31. A connection rod 32b is provided at the lower edge of second die 32 and is connected to the drive motor 32c through the converter which converts rotary motion to linear motion. The driving force of the drive motor 32c reciprocates the second die 32 between the molding position of the upper molding section shown in FIG. 9 and the molding position of the side molding section shown in FIGS. 10 to 12.

The third die 33 is installed so as to reciprocate in the direction perpendicular to the second die 32, and the connecting rod 33b provided at the left end of the third die 33 is connected to the drive motor 33c through the converter which converts rotary motion to linear motion. A triangular shielding lug 331 is formed at the right tip of third die 33 so as to correspond to the rainwater groove 28 of the above-mentioned windshield molding 2. The shielding 331 of the third die 33 is positioned so as to enter the extrusion opening 341 of first die 31 and is designed to reciprocate in interlock with the reciprocating motion of second die 32 as shown in FIGS. 9 to 12.

The following discussion explains the production method of the windshield molding 2 with the above-mentioned molding extruder 3:

To produce the windshield molding 2, the upper molding section 2A, the corner molding section 2B and the side molding section 2C are extruded as a single molding, and it is produced in the order of side molding section 2C, corner molding section 2B, upper molding section 2A, another corner molding section 2B and another side molding section 2C.

When the side molding section 2C is extruded, first die 31 and second die 32 are held in a certain positional relation shown in each of FIGS. 12, 11 and 10, and third die 33 is first brought to the withdrawal position (see FIG. 9), and extrusion of the side molding 2C starts from the lower end (the right end portion in FIG. 3). At the same time a metal wire 23 is fed to the extrusion opening 34 of No. 1 die 31.

When the lower side section is extruded to a certain length in a certain sectional form, third die 33 advances slightly, and the shielding lug of third die 33 enter the extrusion opening 342 of first die 31 as shown in FIG. 12. The rainwater groove 28 starts to be formed by this in the enlarged thick section 22a, and the groove depth is gradually increased as shown in FIGS. 12, 11 and 10 as third die 33 advances. At this time, it is possible to cut the extrusion material corresponding to the rainwater groove 28 by a third die set apart from first die 31. When the extruder is in the state shown in FIG. 10, the rainwater groove 28 reaches the maximum depth. The side molding section with the maximum groove depth shown in FIG. 10 is extruded to a certain length.

When the forming position of the corner molding section 2B approaches, second die 31 is pushed upward, and third die 33 starts to withdraw causing the extrusion opening 342 of first die 31 to reduce and the thickness of the enlarged thick section 22a to decrease. However, sections other than the enlarged thick section 22a maintain the same sectional form. At the same time, as third die 33 withdraws, the depth and width of the rainwater groove 28 both decrease in proportion to the thickness reduction of the enlarged thickened section 22a. At this time, third die 33 moves interlockingly with second die 32. When the corner molding section 2B is completely extruded, second die 32 and third die 33 reach the position shown in FIG. 9.

In other words, when the third die retreats and leaves the extrusion opening 342 of first die 31, the rainwater groove 28 is no longer formed in the enlarged thickened section 22a of the support leg 22, and the whole extrusion opening is shaped so as to correspond with the sectional form of the upper molding section 2A. Then, the upper molding section 2A starts being extruded in a certain sectional form. When the upper molding section 2A is extruded to a certain length, a corner molding section 2B and a side molding section 2C are formed in the reverse order of the above, and the complete windshield molding 2 is produced.

In other embodiments of the windshield molding of the present invention shown in FIGS. 13 to 15, the windshield molding is set with the fastener 44 fixed on the roof panel 12 and the pillar panel 13. A belt-shaped rubber dam 54 is fixed on the flanges 12b and 13b of the body panels 12 and 13. Adhesive 55 is filled by extrusion around the periphery of the rubber dam 54, and the inner side face of the windshield glass 11 is pressed onto said rubber dam. The windshield glass is fixed on the flanges 12b and 13b of the body panels 12 and 13 at approximately equal height.

The above fastener 44 has a locking groove in a U-shaped cross-sectional form, and the external peripheral side wall composing said locking groove is fixed with the adhesive tape 45 along the bent walls 12a and 13a of the body panels 12 and 13. The connection portion 42b at the tip of the support leg 42 of the windshield molding 4 is inserted in the locking groove of the above fastener 44 to fix the windshield molding 4.

The decorative portion 41 which covers the space between the body panels 12 and 13 and the windshield glass 11 from the outside is formed on the outside edge of the above support leg 42 as a single molding. The decorative portion 41 and the support leg 42 shape the cross-sectional form perpendicular to the longitudinal direction to an approximate tee. Also, a thin metal plate 43 is buried as core material near the connection with the decorative portion 41 in the support leg 42.

The decorative portion 41 consists of a glass side decorative portion 41a and a panel side decorative portion 41b which extend from the outside edge of the support leg 42 (the upper end in FIG. 13) to the windshield glass 11 and the body panels 12 and 13, respectively. The glass side decorative portion 41a is composed of a lip-shaped member which covers the outer surface of the windshield glass 11, and the panel side decorative portion 41b is composed of a lip-shaped member which contacts the outer surface of the body panel 12. The glass side decorative portion 41a and the panel side decorative portion 41b have equal thicknesses and shapes respectively throughout the overall length of the windshield molding.

In this embodiment, as well as in the first embodiment, the height difference between the outer surface of the windshield glass 11 and the outer surface of the roof panel 12 is larger at the side molding section than at the upper molding section, and the height of the support leg 42 is gradually increased from the corner section based on the height difference. An enlarged thickened section 42a is provided to enlarge the support leg 42 inward at the place where the support leg height is increased on the side molding section 4c. The enlarged thickened section 42a of the support leg 42 is provided between the above glass side decorative portion 41a and the outer surface of the windshield glass 11, and the thickness in the direction from the inside to the outside (the vertical direction in the figure) of the enlarged thickened section 42a is changed corresponding to the height difference between the outer surface of the windshield glass 11 and the surface of the roof panel 12.

The enlarged thickened section 42a is not provided on the upper molding section 4A for which the height difference is kept constant (see FIG. 13). and the decorative portion 41 and the support leg 42 of uniform thickness and cross section are provided throughout the overall length of the upper molding section 4A. The thickness from the inside to the outside (in the vertical direction in the figure) of the enlarged thickened section 42a in the support leg 42 is increased along the corner molding section from the middle to the lower end toward the side molding section as the above-mentioned height difference increases. The enlarged thick end portion 42a in this area is integrated with the glass side decorative portion 41a. Also, the thickness of the enlarged thick section 42a is maximum corresponding to the maximum height difference along the side molding section 4c (see FIGS. 14 and 15), the maximum thickness being maintained to the lower end of the side molding section.

The enlarged thickened section 42a is provided inside the support leg opposite the windshield glass 11, and the rainwater groove 48 is provided facing the inner periphery along the thickest portion of the enlarged thickened section 42a. The rainwater groove 48 is shaped like the letter "U" in its cross section and is provided along the side molding sections from the lower end of the corner molding section 4b to the lower portion of the side molding section. The width of the rainwater groove is constant in the longitudinal direction, but the depth is suitably changed in the longitudinal direction of the windshield molding.

In the upper portion of the side molding section shown in FIG. 14, the depth of the rainwater groove is set to the maximum of δ, and in the portion slightly lower than the above-mentioned portion shown in FIG. 15, the groove width is kept constant, but the groove depth is set to ε, slightly shallower than the maximum depth of δ.

In the case of such body side structure for fixing the windshield glass 11, rainwater falling on the windshield glass is led to the inner wall of the windshield molding 4 and is drained to the specified portion. Rainwater on the windshield glass runs over the inner peripheral wall of the decorative portion 41 of the upper and the corner molding sections 4A, 4b to the roof panel 12 and rainwater is collected at the side molding section 4C and is led along the rainwater groove 48 in the enlarged thickened section 44a of the support leg 42, the depth of the rainwater groove being suitably changed to allow rainwater to flow smoothly and drain properly through the groove.

As explained above, the present invention is as operative and effective even in the second embodiment as in each of the above embodiments. It is also possible even in this embodiment to insert the windshield molding 4 combined with the windshield glass 11 into the window frame or to first insert the windshield glass 11 into the window frame and to insert the support leg of the windshield molding in the space between the periphery of the windshield glass 11 and the body panels 12 and 13.

Also, the windshield moldings mentioned in each of the above embodiments are applicable not only to the windshield glass but also to rear window glass and other window glass in the same way.

In other embodiments of the windshield molding of the present invention shown in FIGS. 16 to 22, a windshield molding 5 is composed of the upper molding section 5A, the side molding sections 5C and the curved corner molding sections 5B which are formed continuously as a single molding by extrusion.

The windshield molding 5 in this embodiment is provided with the support leg 52 and the decorative portion 51. A wire 53 of the core is buried in the central portion of the support leg 52. A lip-shaped portion 54 which holds the inside edge (i.e. the lower side) of the windshield glass 11 and an elastic lip 55 which extends to and is pressed to the walls of the body panels are provided on the inside edge (i.e. the lower side of FIG. 17) of the support leg 52 throughout the entire length.

Figure 21:
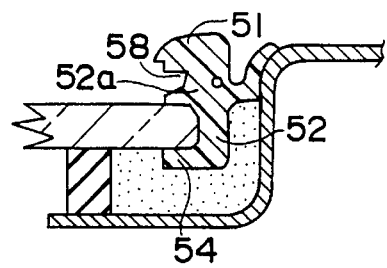
FIG. 21 is a cross-sectional view taken along line XXI—XXI in FIG. 17.
Figure 22:
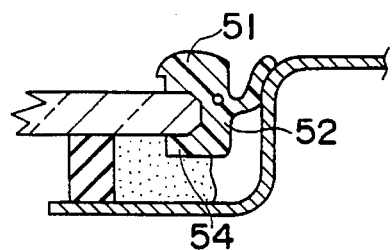
FIG. 22 is a cross-sectional view taken along line XXII—XXII in FIG. 17.
Figure 23:
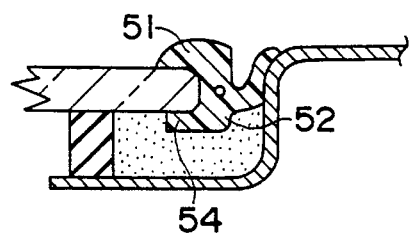
FIG. 23 is a cross-sectional view taken along line XXIII—XXIII in FIG. 17.

The height of the support leg 52 from the inside edge to the outside edge (i.e. the vertical direction in FIG. 17) is gradually increased from the corner molding section (see FIGS. 18 and 19) to the side molding section and reaches a maximum on the upper side of the side molding section (see FIG. 20), but after the maximum height is maintained through the central area of the side molding section 5C, at the lower area of the side molding section 5C the height of the support leg 52 is gradually decreased (see FIGS. 21, 22, 23).

In other words, the thickness in the direction from the outside to the inside of the enlarged thickened section 52a on the support leg 52 is decreased from the lower area to the lower end as the above-mentioned height difference decreases.

The rainwater groove 58 provided on the side molding section 5C shown in FIGS. 17, 19, 20 and 21 is gradually changed in depth and width corresponding to the thickness of the enlarged thickened section 52a and the rainwater groove 58 is discontinued at the specified position.

The rainwater groove 58 provided at the lower portion of the side molding section 5C, as shown in FIG. 21, is only the tip of the triangle.

The following discussion explains the device for forming the above-mentioned windshield molding 5.

Figure 24:
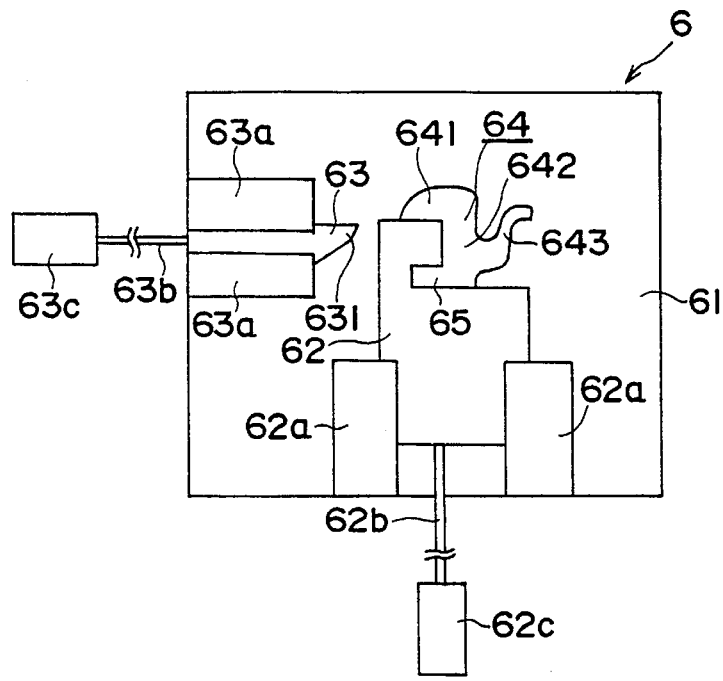
FIG. 24 is an explanatory front view showing an example of an extruder.
Figure 25:
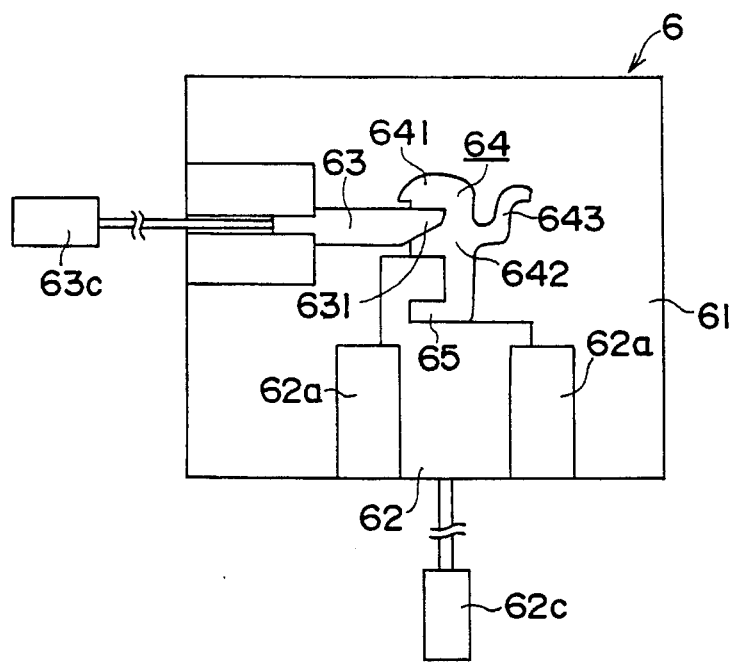
FIG. 25 is an explanatory front view showing the extruder of FIG. 24 is a moved state.

As FIGS. 24 and 25 show, the molding forming unit 6 is fitted with three dies for forming an opening for extruding synthetic resin. These dies include a first die 61, second die 62 and third die 63 arranged in the molding extruding direction (i.e. a vertical direction on the paper). First die 61 is fixed and has an extrusion opening 64 to form the decorative portion 51, the support leg 52 and the elastic lip 55 of the windshield molding 5. The lower section of the extrusion open 64, equivalent to the lip-shaped portion 54 of the windshield molding 5, is provided with a large rectangular opening including the above portion 54.

The above-mentioned extrusion opening 64 consists of an extrusion opening 641 for the decorative portion 51, an extrusion opening 642 for the support leg 52 and an extrusion opening 643 for the elastic lip 55. The extrusion opening 641 is covered with a bow-shaped upper portion corresponding to the upper edge of the decorative portion of the windshield molding 5. In addition, the extrusion opening 642 is shaped like the enlarged thick section 52a of the support leg 52 without the rainwater groove 58 and is connected to the extrusion opening 641.

Second die 62 and third die 63 are made of plate and are supported with pairs of guides, 62a, 62a and 63a, 63a respectively so as to move in parallel with the front of first die 61. The extrusion opening 65 of second die 62 is shaped so as to correspond to the lower portion of the support leg 52 of the windshield molding 5, and the lip-shaped portion 54. In addition, dies 61 and 62 are aligned so that an open area of the second die 62 provided at the upper side of the section corresponding to the support leg 52 is connected to the section corresponding to the enlarged thickened section 52a in the extrusion opening 64 of the first die 61.

A connection rod 62b is provided at the lower edge of second die 62 and is connected to the drive motor 62c through the converter which converts rotary motion to linear motion. The driving force of the drive motor 62c reciprocates second die 62 between the molding position of the upper molding section shown in FIG. 24 and the molding position of the side molding section shown in FIG. 25.

Third die 63 is installed so as to reciprocate in the direction perpendicular to second die 62, and the connecting rod 63b provided at the left end of third die 63 is connected to the drive motor 63c through the converter which converts rotary motion to linear motion. A triangular shielding lug 631 is formed at the right tip of third die 63 so as to correspond to the rainwater groove 58 of the above-mentioned windshield molding 5. The shielding lug 631 of third die 63 is positioned so as to enter the extrusion opening 64 of first die 61 and is designed to reciprocate in interlocking relationship with the reciprocating motion of second die 62.

The following discussion explains the production method of the windshield molding 5 with the above-mentioned molding extruder 6:

When the extrusion is started from the lower end of the side molding section 5C, said first die 61 and second die 62 are held in a certain positional relationship as shown in FIG. 24 and third die 63 is brought to the withdrawal position. Upon extrusion of the lower area of the side molding section 5C, second die 61 is pushed downward causing the extrusion opening 642 of first die 61 to enlarge and the thickness of the enlarged thick section 52a to increase, and third die 63 starts to move forward. However, sections other than the enlarged thickened section 52a maintain the same sectional form. At the same time, as the third die 63 moves forward, the depth and width of the rainwater groove 58 both increase proportional to the additional thickness of the enlarged thickened section 52a. At this time, third die 63 moves in an interlocking manner with second die 62.

When the side section 5C is extruded to a certain length and in a certain sectional form maintaining first die 61, second die 62 and third die 63 in a constant position with respect to each other and the forming position of the corner molding section 5B approaches, the second die 62 is pushed upward, and third die 63 starts to withdraw causing the extrusion opening 642 of first die 61 to be reduced and the thickness of the enlarged thickened section 52a to be decreased. At the same time, as the third die 63 withdraws, the depth and width of the rainwater groove 58 both decrease in proportion to the thickness reduction of the enlarged thickened section 52a. At this time, third die 63 moves interlockingly with second die 62. When the corner molding section 5B is completely extruded, second die 62 and third die 63 reach the position shown in FIG. 24.

In other words, when the third die 63 retreats and leaves the extrusion opening 642 of first die 61, the rainwater groove 58 is no longer formed in the enlarged thick section 52a of the support leg 52, and the whole extrusion opening is shaped so as to correspond with the sectional form of the upper molding section 5A. Then, the upper molding section 5A starts being extruded in a certain sectional form. When the upper molding section 5A is extruded to a certain length, a corner molding section 5B and a side molding section 5C are formed in the reverse order of the above, and the complete windshield molding 5 is produced.

Industrial Applicability

The present invention is applicable to all types of windshield moldings for automobiles with rainwater grooves and is suitable to produce the whole windshield molding as a single molding without requiring additional cutting or other processes.

What is claimed as new and desired to be secured by Letters Patent of the United States is:

1. A windshield molding for vehicles having an upper molding section and a side molding section to be fitted along the periphery of the windshield glass fitted into the window frame opening of the body panel and further including a corner molding section interconnecting the upper molding section and the side molding section, said windshield molding comprising:

a support leg located between the periphery of said windshield glass and an inner edge of the window frame opening of the body panel, a decorative portion provided on the outside edge of the support leg to cover-said space from the outside, said support leg having an enlarged thickened section along the side molding section and a rainwater groove opening to the inner periphery of the windshield molding, wherein said decorative portion has a outer contour extending throughout the entire length of the windshield molding and is projected outwards apart from the windshield glass surface at least along a part of the side molding section, said enlarged thickened section is located between the decorative portion and an outer surface of the windshield glass, said enlarged thickened section increasing in height from said corner molding section and extending along said side molding section with a substantially uniform height to a lower portion of the side molding section, said enlarged thickened section additionally completely surrounding upper and lower ends of the rainwater groove, and said rainwater groove is provided in the enlarged thickened section of said support leg wherein a depth of the groove is changed along a longitudinal axis of the windshield molding.

2. A windshield molding according to claim 1, wherein the rainwater groove is discontinued at the lower area of the side molding section.

3. A windshield molding according to claim 1 wherein the groove depth is gradually reduced from the side molding to the corner molding section.

4. A windshield molding according to claim 3, wherein the rainwater groove is discontinued at the corner molding section.

5. A windshield molding according to claim 4, wherein the projection distance of the decorative portion from the windshield glass surface is gradually reduced from the side molding section to the corner molding section.

6. A windshield molding according to claim 1, wherein the windshield molding has a pair of side molding sections fitted along the periphery of both sides of the windshield glass.

7. A windshield molding according to claim 1, wherein the windshield molding has a lip shaped leg which holds the inside edge of the windshield glass.

8. A windshield molding for vehicles having an upper molding section and a side molding section to be fitted along the periphery of the windshield glass fitted into the window frame opening of the body panel and further including a corner molding section interconnecting the upper molding section and the side molding section, said windshield molding comprising:

a support leg inserted into a space between the periphery of said windshield glass and an inner edge of the window frame opening of the body panel, a decorative portion provided on the outside edge of the support leg to cover said space from the outside, and a rainwater groove opening to the inner periphery of the windshield molding, wherein said rainwater groove is provided at a central portion of the side molding section, said support leg along the side molding section having an enlarged thickened section, said enlarged thickened section increasing in height from said corner molding section and along said side molding section, said enlarged thickened section additionally completely upper and lower ends of the rainwater groove.

9. A windshield molding according to claim 8, wherein the groove depth is changed in the longitudinal direction of the windshield molding.

10. A windshield molding according to claim 8, wherein the groove opening width is changed in the longitudinal direction of the windshield molding.

11. A windshield molding according to claim 8, wherein the rainwater groove extends from an upper area to a center area of the side molding section.

12. A windshield molding according to claim 8, wherein the groove depth is gradually reduced from the side molding section to the corner molding section.

13. A windshield molding according to claim 12, wherein the rainwater groove is discontinued at the corner molding section.

14. A windshield molding according to claim 13, wherein the projection distance of the decorative portion from the windshield glass surface is gradually reduced from the side molding section to the corner molding section.

15. A windshield molding according to claim 8, wherein the windshield molding has a pair of side molding sections fitted along the periphery of both sides of the windshield glass.

16. A windshield molding according to claim 8, wherein the windshield molding has a lip shaped leg which holds the inside edge of the windshield glass.

17. A windshield molding according to claim 8, wherein the decorative portion is projected outwards apart from the windshield glass surface at least along the section having the rainwater groove.

18. A windshield molding according to claim 17, wherein said decorative portion has a constant cross-sectional form throughout the entire length.

19. A windshield molding according to claim 1 wherein at least part of the thickened section has a substantially uniform height and thickness and said height is substantially equal to said thickness.

20. A windshield molding according to claim 5, wherein the windshield molding has a pair of side molding sections fitted along the periphery of both sides of the windshield glass.

21. A windshield molding according to claim 5, wherein the windshield molding has a lip shaped leg which holds the inside edge of the windshield glass.

22. A windshield molding according to claim 14, wherein the windshield molding has a pair of side molding sections fitted along the periphery of both sides of the windshield glass.

23. A windshield molding according to claim 14, wherein the windshield molding has a lip shaped leg which holds the inside edge of the windshield glass.

* * * * *